United States Patent [19]

Swanson et al.

[11] Patent Number: 5,056,032

[45] Date of Patent: Oct. 8, 1991

[54] COMPRESSOR MOTOR PROTECTION SYSTEM

[75] Inventors: Robert M. Swanson; Paul C. Pentmeester, both of La Crosse, Wis.

[73] Assignee: American Standard Inc., New York, N.Y.

[21] Appl. No.: 502,354

[22] Filed: Mar. 30, 1990

[51] Int. Cl.⁵ .................... G06F 15/20; G06F 15/46; G06F 15/56
[52] U.S. Cl. .................... 364/483; 361/22; 361/23; 364/492
[58] Field of Search .................... 318/563-565, 318/635, 650; 361/5, 22, 23, 24, 28, 31; 340/825.32; 62/161, 132; 364/483, 492, 184, 187, 505

[56] References Cited

U.S. PATENT DOCUMENTS

| | | | |
|---|---|---|---|
| 4,319,298 | 3/1982 | Davis et al. | 361/24 |
| 4,470,092 | 9/1984 | Lombardi | 361/23 |
| 4,717,985 | 1/1988 | Demeyer | 364/483 |
| 4,722,019 | 1/1988 | Pohl | 361/22 |
| 4,788,647 | 11/1988 | McManus et al. | 364/492 |
| 4,835,706 | 5/1989 | Asahi | 364/492 |
| 4,939,437 | 7/1990 | Farag et al. | 361/24 |

*Primary Examiner*—Kevin J. Teska
*Attorney, Agent, or Firm*—William J. Beres; William O'Driscoll

[57] ABSTRACT

A method, and apparatus, for protecting a compressor motor in a refrigeration system from overload comprising the steps of setting a first overload trip point; setting a second overload trip point; comparing the first trip point setting with the second trip point setting; and shutting down the compressor motor if the first trip point setting is not substantially equal to the second trip point setting.

19 Claims, 2 Drawing Sheets

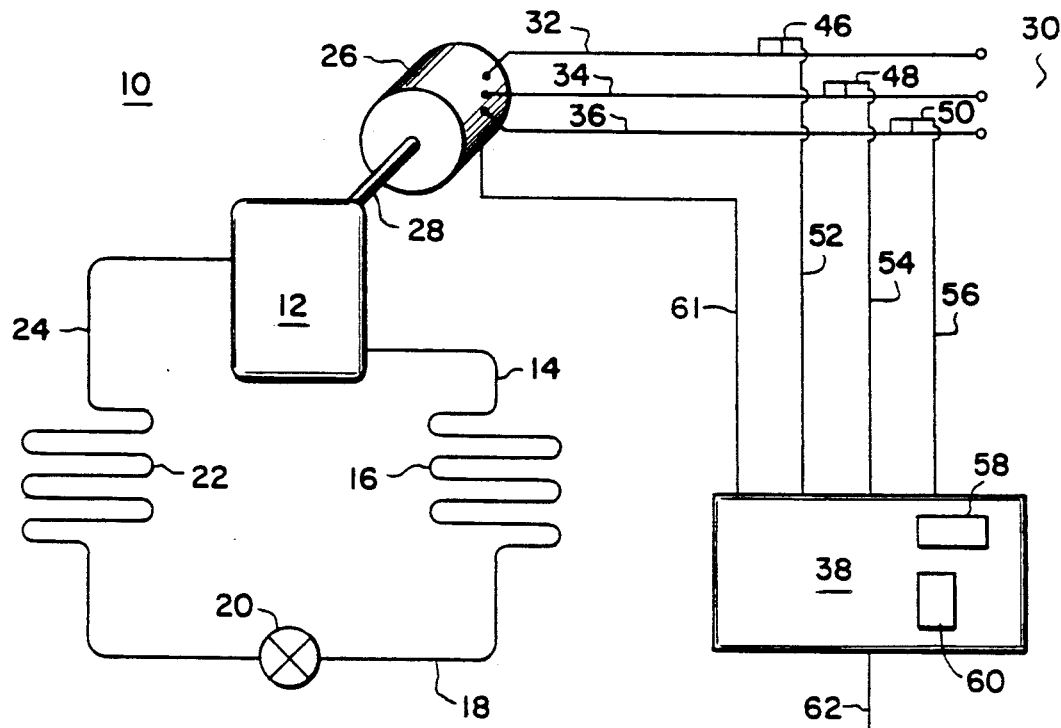
FIG. 1
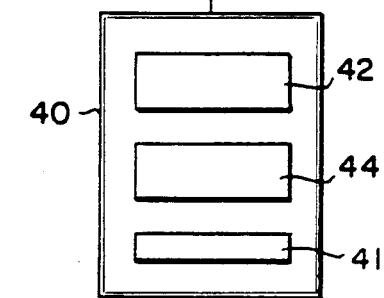
FIG. 3
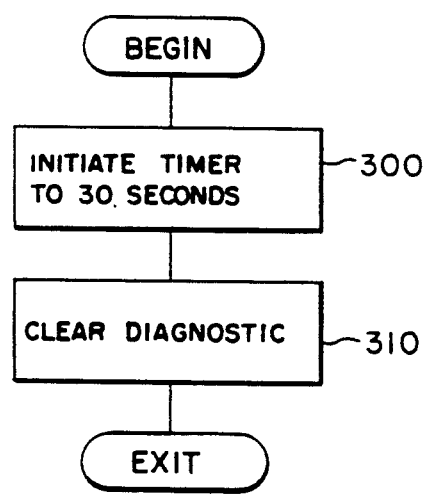

COMPRESSOR MOTOR PROTECTION SYSTEM

DESCRIPTION

1. Technical Information

The present invention is directed to a protection system for compressor motors in refrigeration systems, and more particularly, to the prevention of compressor motor running and start current overload resulting from inaccurate or faulty equipment in the protection system.

2. Background of the Invention

Compressor protection systems monitor the current transmitted from a power source to the compressor motor using a variety of current transformers which are specific to the particular design of the refrigeration system. The current transformers each step down the amount of motor supply current from high motor supply amperages in the 100 to 400 amp range to lower amperages in the 0 to 100 milliamp range which can be used by a refrigeration system controller. An input device, typically a DIP switch, provides the compressor protection system with an adjustment value specific to the particular type of current transformer monitoring the motor current. The adjustment value is used by the compressor system to normalize the readings from the variety of current transformers available for use in the refrigeration system. This ensures that the peak and overload values used in the controller to determine whether an overload is occurring are independent of the physical components in the refrigeration system. Thus the compressor protection system protects the compressor motor by shutting down the compressor whenever a specific normalized current level is exceeded, without regard to the particular compressor and current transformer being used.

In existing refrigeration protection systems, the DIP switch is susceptible to failure, accidental alteration, or tampering because the DIP switch is usually located in a readily accessible position in the vicinity of the controller. Alterations or failures of the DIP switch and attendant circuitry which in any way result in a higher overload value being used by the compressor motor protection system can directly lead to motor damage or burnout due to current overload. Alterations or failures of the DIP switch which result in a lower overload value being used by the compressor motor protection system result in nuisance alarms and shutdowns of the compressor. In the past it has been necessary to physically cover the DIP switch with a tamper resistant cover to protect the DIP switch from unauthorized or accidental alteration. This is an expensive and cumbersome solution which does not address the problem of DIP switch field failures.

SUMMARY OF THE INVENTION

It is an object of the invention to solve the problems of the prior art compressor motor protection systems.

It is an object and advantage of the invention to provide a compressor motor protection system which is not subject to alteration or failure of critical components in the compressor protection system.

It is a further object and advantage of the present invention to provide a compressor motor protection system which shuts down the compressor if the overload protection values used by the system cannot be verified as accurate.

It is an object and advantage of the present invention to reduce the number of critical components in a motor compressor protection system.

It is an object and advantage of the present invention to eliminate the need for a tamper resistant cover.

The present invention provides a method of protecting a compressor motor in a refrigeration system from overload comprising the steps of setting a first overload trip point; setting a second overload trip point; comparing the first trip point setting with the second trip point setting; and shutting down the compressor motor if the first trip point setting is not substantially equal to the second trip point setting.

The present invention provides a method of protecting a compressor motor in a refrigeration system from overload comprising the steps of: reading a first overload setpoint; entering a second overload setpoint at a remote location; transmitting the second overload setpoint from the remote location to the compressor motor protection system; comparing the first setpoint with the second setpoint; and disabling the compressor motor if the first setpoint is not substantially equivalent to the second setpoint.

The present invention provides apparatus for protection a compressor motor in a refrigeration system from overload The apparatus comprises a compressor motor; a manual switch for setting a first compressor overload trip point; a software function for setting a second compressor overload trip point; a comparator for comparing the first trip point setting with the second trip point setting; and means for shutting down the compressor motor if the first trip point setting is not equal to the second trip point setting.

The present invention provides a refrigeration system including: a compressor; a motor operably connected to the compressor; a power source for supplying the motor with multiphase AC power; a controller for monitoring the power supply; a manually selectable switch for entering a first overload trip point; means for shutting down the compressor; a software function for entering a second alternate trip point; and means for initiating the compressor shut down means if the first and second trip points are not substantially the same.

BRIEF DESCRIPTION OF THE DRAWINGS

FIG. 1 is a block diagram of a refrigeration system using the compressor motor protection system of the present invention.

FIG. 3 is a flow diagram of the initialization routine of the present invention.

DETAILED DESCRIPTION OF THE INVENTION

Figure 2:
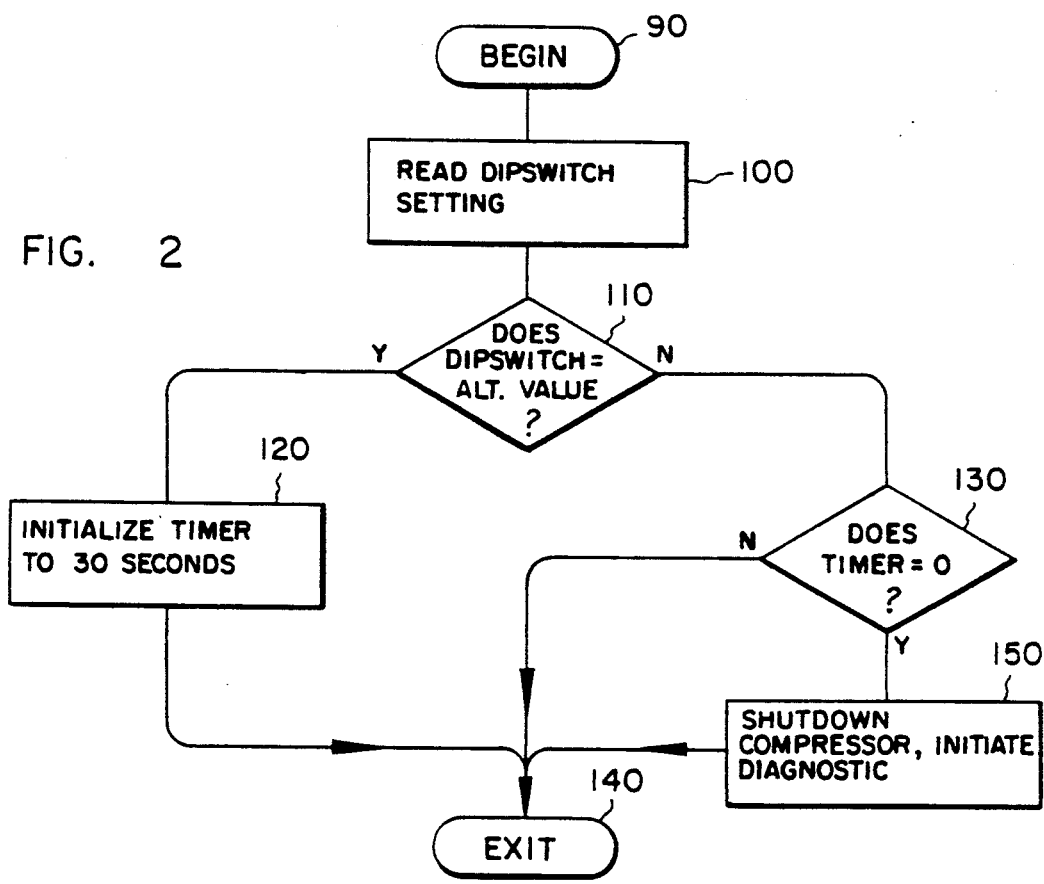
FIG. 2 is a flow diagram of the operation of the present invention.

As is shown in FIG. 1, a refrigeration system 10 typically includes a compressor 12 for compressing vaporized refrigerant, and a hot gas line 14 for conducting the compressed refrigerant vapor to a condenser 16. In the condenser 16 the condensed refrigerant vapor is condensed into a liquid by heat exchange with a cooling medium. The liquid refrigerant is conducted from the condenser 16 by a refrigerant line 18 through an expansion valve 20 to an evaporator 22. In the evaporator 22 the refrigerant vaporizes in the process of heat exchange with a medium to be cooled. The expansion valve 20 maintains the high side pressure created by the compressor 12, and controls the flow of refrigerant to the evaporator 22. A suction line 24 conducts the vaporized refrigerant from the evaporator 22 back to the compressor 12.

Typically the compressor 12, whether a reciprocating, a scroll, a centrifugal or a screw compressor, is connected to a motor 26 by a common axis and motor shaft 28. The motor 26 is shown as an induction motor supplied with power by a suitable power supply 30 such as three-phase AC power. Three wires 32, 34 and 36 each supply one phase of the three-phase AC power to the motor 26. The invention is not intended to be limited to three-phase induction motors, but contemplates various current phases. Additionally, the invention is applicable to condenser fan motor protection systems and air handling motor protection systems.

A motor compressor protection module 38 is provided to monitor the operation of and protect the compressor 12. The motor compressor protection module 38 includes a NEC 78C10 microprocessor in the preferred embodiment. The operating system provided with the NEC microprocessor includes a timer routine available for use by applications programs which periodically decrements certain RAM storage locations in the microprocessor until those storage locations contain a zero value. The motor compressor protection module 38 also typically includes a number of functions relating to compressor protection including such functions as overcurrent and phase unbalance protection. The operation of the motor compressor protection module 38 will be discussed only to the extent necessary to provide an understanding of the present invention.

The motor compressor protection module 38 is operably connected to current transformers 46, 48 and 50 by means of wires 52, 54 and 56. These current transformers 46, 48 and 50 respectively monitor the current transmitted in wires 32, 34 and 36. The current transformers 46, 48 and 50 are identical step down transformers selected by the refrigeration system designer to step down the amperage supplied to the compressor motor 26 to a value in the 0 to 100 milliamp range. For example, in a system where a 100 ton compressor with a 200/230 volt power supply is supplied with 375 amps of current, a 400 amp current transformer is selected to step down the current because 375 amps of current falls within the operable range of the 400 amp current transformer. However, the 322 amps of current supplied to an 85 ton compressor by a 200/230 volt power supply also falls within the operable range of the 400 amp current transformer. Since the overload trip point must trip at 140% of the name plated rated load amperage of the compressor motor, it is necessary to provide the motor compressor protection module 38 with some sort of adjustment or compensation factor so that the motor compressor protection module 38 can trip at 140% of 375 amps when the 100 ton compressor is used, and at 140% of 322 amps when the 85 ton compressor is used. Setting the adjustment value can be considered equivalent to setting the overload trip point because setting the adjustment value is the only action taken by a factory technician when setting an overload trip point.

An input device such as a dual inline pin (DIP) switch 58 in the motor compressor protection module 38 provides an adjustment value which is specific to the particular step down transformer 46, 48, 50 being used to read the motor current. This adjustment value is used to normalize the 0 to 100 milliamp range of readings received from the current transformers 46, 48 and 50 so that the peak motor current will always read 100 milliamps without regard to the compressor size or the current transformer being used in the refrigeration system 10. The DIP switch 58 typically has five binary settings providing 32 possible values which are used by the motor compressor protection module 38 as an index to a look up table 60 comprising a part of the motor compressor protection module 38. The look up table 60 provides 32 multiplier factors for adjusting the range of current readings from any particular transformer 46, 48, 50 so that the relative peak reading for any current transformer selected for use in the refrigeration system will always be 100 milliamps, enabling the motor compressor system protection module 38 to use the value of 140 milliamps as an overload trip point. For example, if the specific current transformers 46, 48, 50 provide a peak reading of 85 milliamps, the DIP switch 58 is set to indicate an entry in the lookup table corresponding to a multiplier factor of 1.176. This multiplier when multiplied by 85 milliamps gives a compensated value of approximately 100 milliamps. All readings from the specific current transformers 46, 48, 50 are multiplied by the appropriate adjustment factor, and the compressor 26 is shutdown by means of a connecting line 61 if any of the adjusted readings exceeds a trip point of 140 milliamps.

The motor compressor protection module 38 is controlled by a higher level controller 40 which includes a display 42 and a keypad 44 to allow a user to set or alter protection parameters. The high level controller 40 includes a function which allows an operator to enter a value, and a transmission routine which can transmit that value over a serial communications line 62 to the motor compressor protection module 38.

As stated in the Background of the Invention, the present invention protects the compressor motor protection system by ensuring that the failure or alteration of the DIP switch 58 does not allow a current overload to damage the compressor motor 26. The operation of the invention is described as follows.

Figure 4:
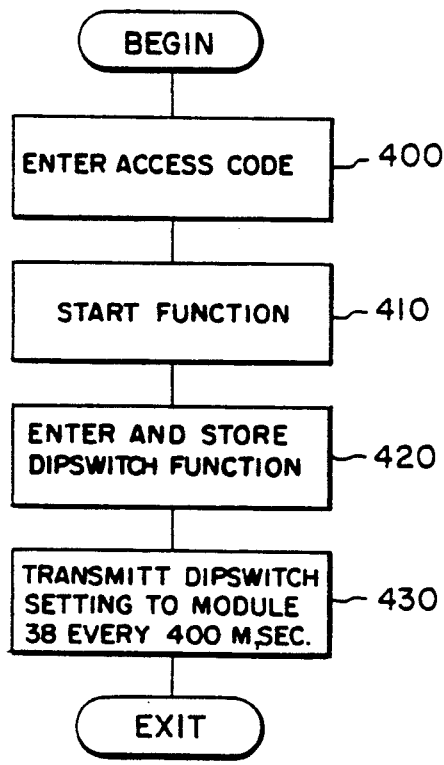
FIG. 4 is a flow diagram of the routine used to enter and continually update a redundant value used by the present invention.

As shown at step 400 in FIG. 4, an access security code is entered on the keypad 44 of the higher level controller 40. At step 410, a code is entered on the keypad 44 to initiate a specific function in the controller 40 which prompts the operator to enter a value corresponding to the DIP switch setting 58. At step 420, this setting is stored in the memory of a conventional microprocessor forming a part of the controller 40 as the alternate DIP switch setting 41. At step 430, the alternate DIP switch setting 41 is transmitted over the serial communications link 62 to the motor compressor protection module 38 every 400 milliseconds. Four hundred milliseconds is a convenient time period in the system of the preferred embodiment but can be varied to meet the needs of different systems.

In the preferred embodiment the alternate DIP switch setting 41 is stored at a remote location from the motor compressor protection module 38. However, the use of a remote location was merely a matter of convenience in the particular system design being used. The alternate DIP switch setting 41 could easily be located in or adjacent the motor compressor protection module 38. Important features of the invention are that the alternate DIP switch setting 41 is redundant to and is regularly compared with the setting of the DIP switch 58.

FIG. 3 shows an initialization routine, entered as a part of the startup routine of the motor compressor protection module 38, which initializes one of the timer storage locations provided by the NEC operating system to a predetermined time delay at step 300, and clears any diagnostic error messages remaining from prior to the module startup at step 310. The time delay is selected by the system designer primarily to enable both the DIP switch 58 to be physically modified and the alternate DIP switch setting 41 to be modified using the function shown in FIG. 4 before the protection system can shutdown the compressor 26. A 30 second period has been determined to be sufficient in the preferred embodiment, although this time period can of course be altered to suit the design and layout of any particular refrigeration system.

FIG. 2 shows an operational flow chart of the present invention, the routine of FIG. 2 being entered at step 90 every 400 milliseconds from an interrupt routine of the microprocessor operating system. At an initial step 100 the DIP switch 58 is read to determine its setting. At step 110 this DIP switch setting 58 is compared with the latest alternate DIP switch setting 41 transmitted from the high level controller 40 over the serial communications link 62. If the DIP switch setting 58 matches the latest alternate DIP switch setting 41, the timer storage location is reinitialized at step 120 to a system designer selected value of 30 seconds in the preferred embodiment, and the routine is exited. Since the DIP switch setting and the alternate DIP switch setting 41 are both digital, the match should be exact. If the DIP switch 58 has been replaced with an analog device such as a potentiometer, the comparison must include an error factor proportional to any error inherent in reading the analog device.

If the DIP switch setting is not equal to the alternate DIP switch setting 41, the value in the timer storage location is compared to zero at step 130. If the timer has not reached zero, the routine is exited at 140 because the unequal settings have not existed for a thirty second period. However, if the timer has reached zero, compressor shutdown is initiated at step 150 and a diagnostic error message is sent over the serial communication link 62 for visual display on the high level controller display 42. The diagnostic message indicates the reason for the compressor shutdown and that manual restart is required.

The present invention ensures that a failure of the DIP switch 58 or an alteration of the DIP switch 58 will not disable the motor compressor protection system to the point that overload damage can occur to the compressor motor 26. A first overload trip point is set by means of the DIP switch, and a second overload trip point is set at an alternate location and regularly transmitted for comparison with first overload trip point setting. If the first and second trip points are unequal the compressor is shut down.

Although the present invention is described in connection with the preferred embodiment above, it is apparent that many alterations and modifications are possible without departing from the present invention. It is intended that all such alterations and modifications be considered within the scope and spirit of the invention as defined in the following claims.

What is claimed and desired to be secured by Letters Patent of the United States is:

1. A method of protecting a compressor motor in a refrigeration system from overload comprising the steps of:
    setting a first overload trip point in an input device of a compressor motor protection system;
    setting a second overload trip point in an alternate location;
    periodically transferring the second overload trip point setting from the alternate location to the compressor motor protection system;
    comparing, in the compressor motor protection system, the first trip point setting with the second trip point setting; and
    shutting down the compressor motor if the comparing step determines that the first trip point setting is not substantially equal to the second trip point setting.

2. The method of claim 1 wherein the step of shutting down the compressor only occurs if the first trip point is not exactly equal to the second trip point.

3. The method of claim 1 including the step of delaying for a predetermined amount of time the step of shutting down the compressor motor.

4. The method of claim 3 wherein the time delay is for a period of 30 seconds.

5. The method of claim 1 wherein the step of setting the first overload trip point includes the further step of entering the first overload trip point setting on a physical switch located in the vicinity of the compressor motor.

6. The method of claim 5 wherein the step of setting the second overload trip point includes the further step of entering the second overload trip point setting at a remote location.

7. The method of claim 6 including the further step of periodically transferring the second overload trip point setting from the remote location to a compressor motor protection system.

8. A method of protecting a compressor motor in a refrigeration system from overload comprising the steps of:
    reading a first overload setpoint from an input device of a compressor motor protection system;
    entering a second overload setpoint at a remote location;
    transmitting the second overload setpoint from the remote location to the compressor motor protection system;
    comparing the first setpoint with the second setpoint; and
    disabling the compressor motor if the comparing step determines that the first setpoint is not substantially equivalent to the second setpoint.

9. Apparatus for protecting a compressor motor in a refrigeration system from overload comprising:
    a compressor motor;
    means for setting a first compressor overload trip point;
    means for setting a second compressor overload trip point at an alternate location from the first trip point setting;
    means for comparing the first trip point setting with the second trip point setting; and
    means for shutting down the compressor motor if the comparing means determines that the first trip point setting is not equal to the second trip point setting.

10. The apparatus of claim 9 including means to temporarily delay the compressor shut down.

11. The apparatus of claim 9 wherein the first setting means includes a manually selectable switch.

12. The apparatus of claim 11 wherein the second setting means includes a high level controller and a function, associated with said computer, to enter and store said second trip point.

13. The apparatus of claim 12 wherein the high level controller is located in proximity to said manually selectable switch.

14. The apparatus of claim 12 wherein the high level controller is at a location remote from the manually selectable switch.

15. The apparatus of claim 14 further including means for transmitting said second trip point to said comparing means.

16. A refrigeration system including:
a compressor;
a motor operably connected to said compressor;
means for supplying said motor with multiphase AC power;
means for monitoring said power supply means;
a manually selectable switch for entering a first overload trip point;
means, responsive to the monitoring means and the manually selectable switch, for shutting down said compressor;
means for entering a second alternate trip point at an alternate location from the manual switch; and
means for initiating said compressor shut down means if said first and second trip points are not substantially the same.

17. The refrigeration system of claim 16 wherein the second entering means includes a high level controller located at a remote location.

18. A method of protecting a motor in a refrigeration system from overload comprising the steps of:
setting a first overload trip point;
setting a second overload trip point at an alternate location from the first trip point;
comparing the first trip point setting with the second trip point setting; and
shutting down the motor if the comparing step determines that the first trip point setting is not substantially equal to the second trip point setting.

19. A refrigeration system including:
a motor;
means for supplying said motor with multiphase AC power;
means for monitoring said power supply means;
a manually selectable switch for entering a first overload trip point;
means, responsive to the monitoring means and the manually selectable switch, for shutting down said motor;
means for entering a second alternate trip point at an alternate location from the manually selectable switch; and
means for initiating said motor shut down means if said first and second trip points are not substantially the same.

* * * * *

UNITED STATES PATENT AND TRADEMARK OFFICE
CERTIFICATE OF CORRECTION

PATENT NO. : 5,056,032

DATED : October 8, 1991

INVENTOR(S) : Robert M. Swanson and Paul C. Rentmeester

It is certified that error appears in the above-identified patent and that said Letters Patent is hereby corrected as shown below:

Title Page:

Inventors: "Paul C. Pentmeester" should read --Paul C. Rentmeester--.

Signed and Sealed this

Twenty-sixth Day of January, 1993

Attest:

STEPHEN G. KUNIN

Attesting Officer      Acting Commissioner of Patents and Trademarks